Nov. 22, 1932.  D. FLEISCHER  1,888,914
METHOD OF MARKING FILMS FOR PRODUCING SOUND EFFECTS
Filed Nov. 21, 1929
Fig. 1.   Fig. 2.   Fig. 3.
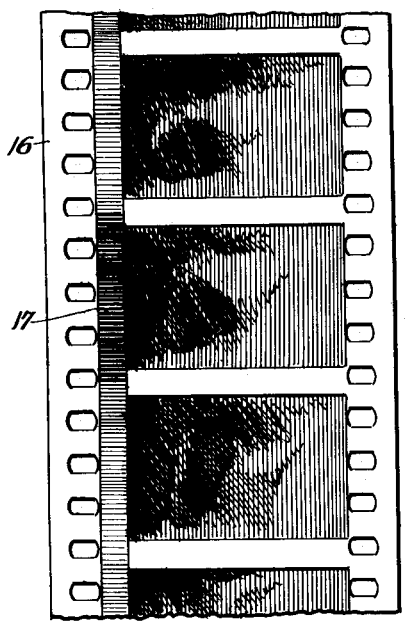
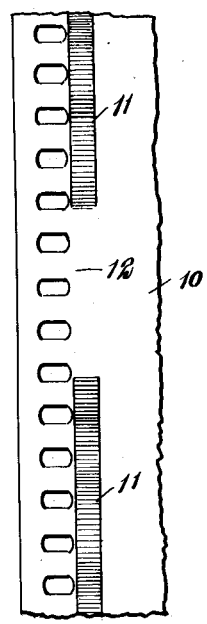
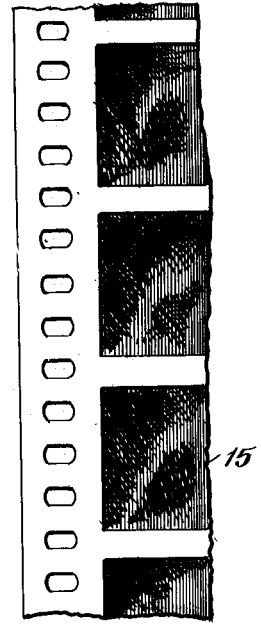
Fig. 4.
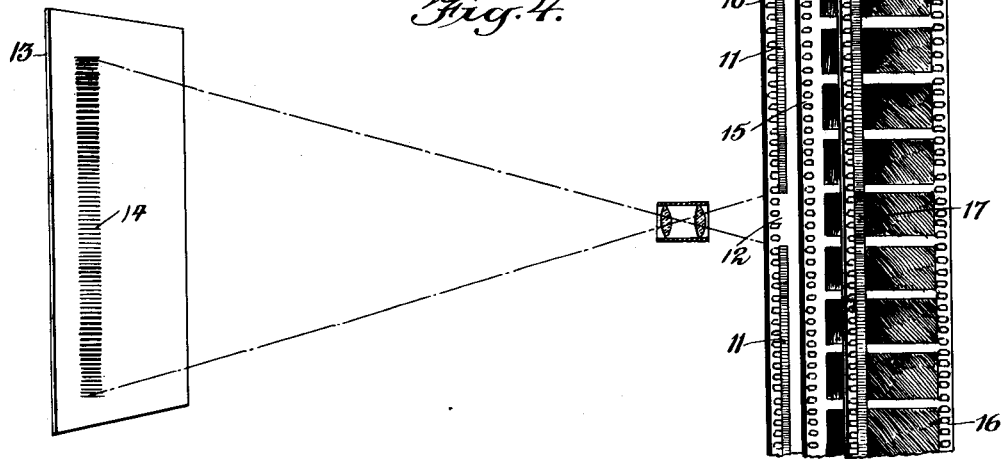
WITNESSES
INVENTOR
Dave Fleischer
BY
ATTORNEYS Patented Nov. 22, 1932

1,888,914

UNITED STATES PATENT OFFICE

DAVE FLEISCHER, OF BROOKLYN, NEW YORK

METHOD OF MARKING FILMS FOR PRODUCING SOUND EFFECTS

Application filed November 21, 1929. Serial No. 408,865.

This invention relates to an improvement in methods of making records capable of being used to produce varying intensities of light, to affect suitable means, such as a photoelectric circuit, for the purpose of producing sounds, or sound effects in conjunction with motion pictures or otherwise.

The invention is based upon the idea that sound records which consist of successive variegated lines or stripes extending crosswise of a record band, may be simulated by hand inscription, either directly upon such band, or upon suitable material to constitute a matrix, which may be used to transfer the lines or stripes to the band in accordance with well known practices, such as by photography.

The invention in its broadest aspect has for its principal object the making or formulating of sound records of the indicated character, without first having to produce any sounds, that is to say, without utilizing any sound producing apparatus, as is now the practice, to the end, that great economy will be achieved from the viewpoints of time, labor and expense.

The invention will be best understood from a consideration of the following specification taken in conjunction with the accompanying drawing, with the further understanding that the drawing is merely illustrative of one example of how the result looked for may be accomplished, and that the invention is not restricted to any strict conformity with the showing in the drawing, but that in accordance with the invention as expressed in the claims hereunto appended all rights to adopt other obvious ways and means are reserved.

In the drawing:

Figure 1 is a face view of a portion of a finished positive record band, showing insert of appropriate sound markings, lines or stripes.

Fig. 2 is a view similar to Fig. 1, but showing a portion of negative record band, with an incomplete or interrupted sound record or track.

Fig. 3 is a face view of a portion of a negative motion picture film.

Fig. 4 is an illustration of one manner in which a record band may be marked in accordance with the invention.

In the drawing, by way of example, there is shown portions of the usual motion picture films having the usual sprocket perforations along the side margins thereof, and photo-sensitive coating or emulsion.

It has been the practice to run one film for the sound record, and one film for the series of pictures or drawings, after which these films are laid together and the matter thereon being superposed in a printing or copying operation on a third film, to produce a positive film having the sound record and series of pictures combined on the same film suitable for the picture projecting and sound reproducing apparatus.

To produce the sound record on a film under the usual practice involves considerable preparation and also requires much time, labor and expense, due to the nature of the work and the appurtenances and divers devices required. The sound records sometimes are poorly produced upon the negative films and sometimes portions are entirely omitted.

In accordance with the present invention films are marked to provide complete sound records or inserts are provided to complete interrupted or broken sound records of negative films. In Fig. 2 there is shown by way of example a portion 10 of a negative film having a sound record 11 interrupted at 12. In accordance with the present invention use is made of a piece 13 of suitable material such as paper or the like shown in Fig. 4, on which are graphically inscribed, applied or impressed, by hand of a skilled person, lines or stripes 14, on an enlarged scale. These lines or stripes 14 represent vibrations corresponding to the pitch or tonal qualities of sound waves as would be produced by certain sound producing devices or the voices of natural beings, and in the instant case, supply the proper lines or stripes omitted from the record 11 to complete the latter. Accordingly a negative film having only a series of pictures may be used, a portion 15 of such film being shown in Fig. 3. Use is also made of a third film having the usual photo-sensitive emulsion thereon intact, a portion of such film is shown in Figs. 1 and 2, and designated 16. In order to complete the record 11 of the film 10, the appropriate lines or stripes 14 of the matrix are registered on the film 16. This is accomplished by the use of a copying camera, the films 10, 15 and 16 being laid together, and are arranged in the copying camera. When the point of the film 10 is moved to a point in which the space 12 of the film 10 is in registry with the lenses of the camera, the lines or stripes 14 on the matrix 13, by the usual photographic operation will be registered on the film 16, as indicated diagrammatically in Fig. 4. It will be understood that the film 16 when completed will contain the series of pictures on the film 15 and the portions of the sound record on the film 10, together with that portion of the sound record presented by the lines or stripes 14 of the matrix 13, the latter being reduced to the proper scale in the photographic operation. For the sake of clearness, the lines or stripes 14 as registered on the film 16 have been designated 17 and appear in Figs. 1 and 4.

It is to be understood that the entire sound record of a film, may be registered thereon, by the use of a suitable matrix containing the proper lines or stripes inscribed, applied or impressed thereon by the hand of a skilled person, in combination with a series of pictures on a separate film, or without using such separate film having a series of pictures thereon. It is also to be understood that a film may be marked directly by hand in which use will be made of some indelible or insoluble ink to constitute a complete sound record or portion thereof. Therefore the present invention resides in the method of making a film of the indicated character, and in the film having the characteristics set forth.

It is to be understood that in marking or delineating the sound record or sound track according to the present method, the markings, lines or stripes will be manually produced with a graphic instrument, pen or stylus and ink or other suitable substance.

Simply stated, the present invention resides in the making of a sound track to produce various sounds including those of the human voice without recording such sounds as they are produced or uttered. In fact, the sound track of the present invention is intended to cause the production of such sound as would ordinarily be produced by certain objects moving in a certain way and acting and reacting in the usual manner of such objects or sounds produced by the vocal cords of humans and animals. This is accomplished by drawing, painting or otherwise depicting or delineating a sound track having the usual variegated arrangement of lights and shadows in that form which by suitable instrumentalities will cause the production of the desired sound effects and this without previously recording such sounds as they are produced. It is therefore to be clearly understood that the present invention is distinguished from the production of sound tracks from previously produced sound. The sound track of the present invention is not the reproduction of a previously recorded sound track but the making of a sound track to produce a sound which has never heretofore been produced.

I claim:

1. The method of producing a sound track which consists in manually marking suitable material to present that appearance of lights and shadows to render it capable of co-operating with a sound producing apparatus to produce sound.

2. The method of producing a sound track which consists in manually marking suitable material to present that appearance of lights and shadows to render it capable of co-operating with a photo-electric sound producing apparatus to produce sound.

3. The method which consists in manually delineating on suitable material lights and shadows productive of desired light effects capable of being translated into sound.

4. The method of manually marking a suitable material to vary its light transmitting capacity in such manner as to render it capable of co-operating with suitable apparatus to produce sound.

5. A manually delineated sound track capable of producing desired sound when used in a suitable apparatus.

6. The method of making an original sound track on suitable material which consists in manually marking the track thereon.

7. A manually delineated sound track capable of influencing a photo-electric sound apparatus to produce desired sound.

8. A matrix having a manually delineated original sound track thereon transferable to suitable material to vary its light transmitting capacity so as to render it capable of co-operating with suitable apparatus to produce sound.

DAVE FLEISCHER.